(12) United States Patent
Kruglick

(10) Patent No.: US 10,534,684 B2
(45) Date of Patent: *Jan. 14, 2020

(54) TRACKING CORE-LEVEL INSTRUCTION SET CAPABILITIES IN A CHIP MULTIPROCESSOR

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/836,167

(22) Filed: Dec. 8, 2017

(65) Prior Publication Data

US 2018/0101461 A1    Apr. 12, 2018

Related U.S. Application Data

(63) Continuation of application No. 14/396,058, filed as application No. PCT/US2013/046209 on Jun. 18, 2013, now Pat. No. 9,842,040.

(51) Int. Cl.
| | |
|---|---|
| *G06F 11/00* | (2006.01) |
| *G06F 11/34* | (2006.01) |
| *G06F 9/50* | (2006.01) |
| *G06F 9/48* | (2006.01) |
| *G06F 11/20* | (2006.01) |
| *G06F 11/30* | (2006.01) |

(52) U.S. Cl.
CPC ........ *G06F 11/3409* (2013.01); *G06F 9/4806* (2013.01); *G06F 9/5044* (2013.01); *G06F 11/2033* (2013.01); *G06F 11/3024* (2013.01)

(58) Field of Classification Search
USPC .......................................... 714/11
See application file for complete search history.

(56) References Cited

U.S. PATENT DOCUMENTS

| | | | |
|---|---|---|---|
| 6,134,675 A | 10/2000 | Raina | |
| 7,554,909 B2 | 6/2009 | Raghunath et al. | |
| 2004/0098718 A1 | 5/2004 | Yoshii et al. | |
| 2004/0168716 A1* | 9/2004 | Gritskevich | ............ F24V 40/00 |
| | | | 136/205 |

(Continued)

OTHER PUBLICATIONS

Clark, N., et al., "Application-Specific Processing on a General-Purpose Core via Transparent Instruction Set Customization," MICRO 37 Proceedings of the 37th annual IEEE/ACM International Symposium on Microarchitecture, pp. 30-40 (Dec. 4-8, 2004).
Gillespie, M., "Preparing for the Second Stage of Multi-Core Hardware: Asymmetric (Heterogeneous) Cores," accessed at https://software.intel.com/sites/default/files/m/d/4/1/d/8/Gillespie_hetero-multicore_v2.rh.FINAL.pdf, accessed on Nov. 20, 2017, pp. 1-7.

(Continued)

*Primary Examiner* — Sarai E Butler

(57) ABSTRACT

Techniques described herein generally relate to a task management system for a chip multiprocessor having multiple processor cores. The task management system tracks the changing instruction set capabilities of each processor core and selects processor cores for use based on the tracked capabilities. In this way, a processor core with one or more failed processing elements can still be used effectively, since the processor core may be selected to process instruction sets that do not use the failed processing elements.

20 Claims, 7 Drawing Sheets

(56) References Cited

U.S. PATENT DOCUMENTS

| | | | |
|---|---|---|---|
| 2008/0028408 A1 | 1/2008 | Day et al. | |
| 2008/0059769 A1 | 3/2008 | Rymarczyk et al. | |
| 2008/0235454 A1 | 9/2008 | Duron et al. | |
| 2011/0066828 A1* | 3/2011 | Wolfe | G06F 9/5044 712/220 |
| 2012/0036398 A1* | 2/2012 | Moyer | G06F 9/505 714/48 |
| 2012/0079235 A1 | 3/2012 | Iyer et al. | |
| 2012/0210164 A1* | 8/2012 | Gara | G06F 11/1641 714/10 |
| 2012/0233477 A1 | 9/2012 | Wu et al. | |
| 2013/0061237 A1* | 3/2013 | Zaarur | G06F 9/4856 718/105 |
| 2013/0111264 A1* | 5/2013 | Settsu | G06F 11/0778 714/11 |
| 2014/0195787 A1* | 7/2014 | Scalabrino | G06F 9/3885 712/234 |
| 2015/0067409 A1* | 3/2015 | Martz | G06F 21/00 714/47.2 |

OTHER PUBLICATIONS

International Search Report and the written Opinion of the International Searching Authority for International Application No. PCT/US2013/046209, dated Dec. 11, 2013, pp. 9.

Powell, M.D., et al., "Architectural core salvaging in a multi-core processor for hard-error tolerance," ISCA '09 Proceedings of the 36th annual international symposium on Computer architecture, vol. 37, Issue No. 03, pp. 93-104 (Jun. 20-24, 2009).

Shen, H., and Pétrot, F., "Novel task migration framework on configurable heterogeneous MPSoC platforms," In Proceedings of the 2009 Asia and South Pacific Design Automation Conference, pp. 733-738 (Jan. 19-22, 2009).

Swanson, S., and Taylor, M.B., "GreenDroid: Exploring the Next Evolution in Smartphone Application Processors," IEEE Communications Magazine, vol. 49, Issue. 04, pp. 112-119 (Apr. 5, 2011).

Venkatesh, G., et al., "Conservation Cores: Reducing the Energy of Mature Computations," Proceedings of the fifteenth edition of ASPLOS on Architectural support for programming languages and operating systems, vol. 45, Issue No. 3, pp. 205-218 (Mar. 2010).

* cited by examiner

TRACKING CORE-LEVEL INSTRUCTION SET CAPABILITIES IN A CHIP MULTIPROCESSOR

CROSS-REFERENCE TO RELATED APPLICATIONS

The present application is a Continuation Application under 35 U.S.C, § 120 of U.S. patent application Ser. No. 14/396,058, filed on Oct. 22, 2014, now U.S. Pat. No. 9,842,040, which is a U.S. National Stage filing under 35 U.S.C. § 371 of International Application No. PCT/US2013/046209, filed on Jun. 18, 2013 and entitled "TRACKING CORE-LEVEL INSTRUCTION SET CAPABILITIES IN A CHIP MULTIPROCESSOR." International Application No. PCT/US2013/046209 and U.S. patent application Ser. No. 14/396,058, including any appendices or attachments thereof, is incorporated by reference herein in their entirety.

BACKGROUND

Unless otherwise indicated herein, the approaches described in this section are not prior art to the claims in this application and are not admitted to be prior art by inclusion in this section.

In keeping with Moore's Law, the number of transistors that can be practicably incorporated into an integrated circuit has doubled approximately every two years. This trend has continued for more than half a century and is expected to continue until at least 2015 or 2020. However, simply adding more transistors to a single-threaded processor no longer produces a significantly faster processor. Instead, increased system performance has been attained by integrating multiple processor cores on a single chip to create a chip multiprocessor, and sharing processes between the multiple processor cores of the chip multiprocessor. System performance and power usage can be further enhanced with chip multiprocessors that have core elements configured for multiple instruction sets or for handling different subsets of instruction sets.

SUMMARY

In accordance with at least some embodiments of the present disclosure, a chip multiprocessor comprises a first processor core, a second processor core, and a task manager coupled to the first and second processor cores. The task manager is configured to assign tasks according to a performance profile that includes a capability rating of the first processor core to perform an executable operation included in a first instruction class and a capability rating of the first processor core to perform an executable operation included in a second instruction class, wherein none of the executable operations included in the first instruction class are included in the second instruction class. In response to a fault in the first processor core in performance of the executable operation included in the first instruction class and based on the performance profile, the task manager is further configured to assign performance of the executable operation included in the first instruction class to the second processor core and to update the performance profile to indicate that the first processor core is not capable of performing an executable operation in the first instruction class, and the first processor core remains enabled to perform the executable operation included in the second instruction class.

In accordance with at least some embodiments of the present disclosure, a method of managing tasks performed by a chip multi-processor having multiple processor cores comprises receiving a task to be performed by the chip multi-processor and determining a composition of the task with respect to at least one instruction class. The method may further include selecting a processor core in the chip multi-processor based on a capability rating of the processor core and assigning the task to the selected processor core, where the capability rating comprises a stored value that quantifies the ability of the processor core to perform an operation included in the instruction class. The method may further include assigning the task to the selected first processor core, detecting a fault in the selected first processor core in performance of the assigned task, in response to detecting the fault, assigning at least some operations associated with the task to a second processor core based on a capability rating of the second processor core, updating the capability rating of the first processor core, and continuing to maintain the first processor core in an enabled state, so as to enable the first processor core to perform other operations associated with the task.

In accordance with at least some embodiments of the present disclosure, a method of tracking performance capability of each of the processor cores in a chip multiprocessor having multiple processor cores comprises receiving performance data for a first processor core, where the performance data are associated with the execution of an operation included in an instruction class. The method may further include determining a capability rating for the first processor core to perform the operation included in the instruction class, and updating a performance profile associated with the first processor core based on the determined capability.

In accordance with at least some embodiments of the present disclosure, a chip multiprocessor comprises a first processor core, a second processor core, a capability updater module, and a task manager coupled to the first and second processor cores. The capability updater module is configured to determine a capability rating for the first processor core to perform an executable operation included in a first instruction class and update a performance profile associated with the first processor core based on the determined capability, wherein the performance profile includes a capability rating of the first processor core to perform an executable operation included in a first instruction class and a capability rating of the first processor core to perform an executable operation included in a second instruction class. The task manager is configured to assign tasks according to a performance profile, wherein none of the executable operations included in the first instruction class are included in the second instruction class.

In accordance with at least some embodiments of the present disclosure, a method of managing tasks performed by a chip multi-processor having multiple processor cores comprises receiving performance data for a first processor core, wherein the performance data are associated with the execution of an operation included in a first instruction class, determining a capability rating for the first processor core to perform the operation included in the first instruction class, wherein the capability rating comprises a stored value that quantifies an ability of the first processor core to perform an operation in the first instruction class, and receiving a task to be performed by the chip multi-processor and determining a composition of the task with respect to the first instruction class. The method may further include selecting the first processor core in the chip multi-processor based on the capability rating and assigning the task to the selected processor core.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings:

DETAILED DESCRIPTION

Figure 1:
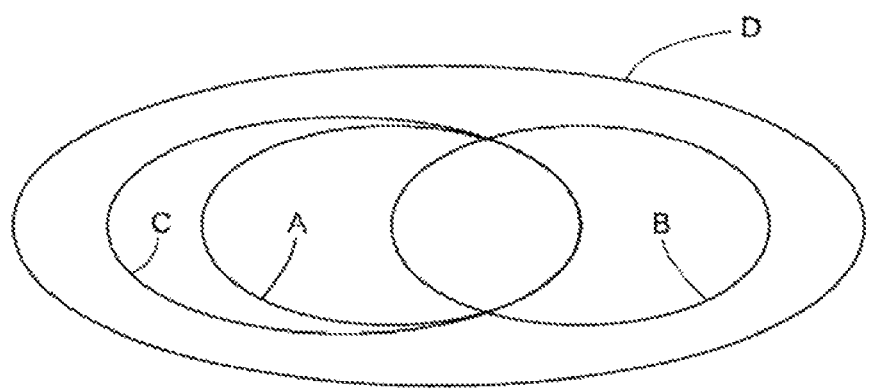
FIG. 1 is a Venn diagram illustrating multiple overlapping instruction sets, each containing a grouping of one or more instruction classes that can be executed on a chip multiprocessor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the disclosure, as generally described herein, and illustrated in the Figures, can be arranged, substituted, combined, and designed in a wide variety of different configurations, all of which are explicitly contemplated and make part of this disclosure.

There is a trend toward large-scale chip multiprocessors that include a relatively large number of processor cores, with core counts as high as hundreds or thousands envisioned in the near future. As this trend continues, efficient use of all processor cores in high core-count chip multiprocessors may become more difficult, due to the increased potential for runtime errors and manufacturing defects. Runtime errors may occur during operation and impair processor core performance. Runtime errors may include "hard faults", which may be caused by wear-out and are generally persistent, and "soft faults", which can often be cleared by resetting the processor. Permanent defects that are formed in a processor core during the manufacturing process can also result in hard faults that impair the performance of one or more processing elements of a core, such as a bit being stuck at a single logical value. As die size, transistor density, and number of processor cores of chip multiprocessors grow, the susceptibility of chip multiprocessors to such faults may increase.

There is currently a trend toward chip multiprocessors with heterogeneous processor core configurations, each configuration having the capability to process different instruction sets or to process a specific instruction set more efficiently than other processor cores of the multiprocessor. In such chip multiprocessors, a processor core that is optimized or otherwise tailored for a specific instruction set can be selected to process applications associated with that specific instruction set, thereby expediting processing of the application.

Any impairments of the performance of a processor core, such as runtime errors or manufacturing defects or other issues in the processor core, can dramatically affect performance of the core for certain instruction sets. Consequently, processor cores suffering from such faults may be commonly disabled, either permanently, or until the chip multiprocessor can be restarted. In many situations, such as in a very high core-count chip multiprocessor in a data center application, restarts can be quite infrequent, and a large number of run-time errors can accumulate in the chip multiprocessor. Furthermore, very high core-count chip multiprocessors may be more likely to contain manufacturing defects than smaller chips, and such hard faults may often result in an affected processor core being disabled.

In general, runtime errors, manufacturing faults, and/or other issues may have a highly localized effect on a processor core, leaving most portions of the core capable of functioning normally. For example, when a fault occurs in a single computing element or submodule of a processor core, e.g., a floating point multiplier module, all other processing elements in the processor core may still function normally. In some instances, such a processor core may be disabled in its entirety by the chip multiprocessor, even though the processor core may still be capable of effectively executing some instruction classes that are not associated with the failed processing element. This disablement may result in an unnecessary waste of processing resources. Furthermore, migration of a thread or task from such a disabled processor core may cause additional overhead and inefficiencies.

Alternatively or additionally, when a non-failure fault has occurred, the affected processor core may not be disabled. In this case, the processor core may continue to be used in the chip multiprocessor for instruction sets that include instruction classes performed by the failed processing element, e.g., a floating point multiplier operation, despite the greatly reduced capability of the processor to execute such instruction sets. This continued usage can significantly retard performance of the chip multiprocessor.

According to embodiments of the present disclosure, a task management system for a chip multiprocessor may track the changing instruction set capabilities of each processor core in the chip multiprocessor and may select processor cores for use based on the tracked capabilities. In this way, a processor core with one or more failed processing elements can still be used effectively; the processor core may be selected for processing instruction sets that do not use the failed processing elements. Such embodiments of the present disclosure may substantially reduce the impact of a processing element failure in situations where processor cores in a chip multiprocessor may have overlapping instruction sets, as illustrated in FIG. 1.

FIG. 1 is a Venn diagram illustrating multiple overlapping instruction sets A-D, each containing a grouping of one or more instruction classes that can be executed on a chip multiprocessor. As shown in this example, instruction set A may be a subset of instruction sets C and D, and instruction sets B and C may be subsets of instruction set D. For example, instruction set A may consist of the integer shift function and instruction set C may include an integer multiply function plus possibly other instruction classes. Since the integer multiply function can include recursive applications of the integer shift, and instruction set A does not include any other instruction classes outside instruction set C, instruction set C is a superset of instruction set A. Thus, a processor core in the chip multiprocessor rated for instruction set C can be assigned any task that can be performed with instruction set A or C. If a fault in such a processor core eliminates or severely compromises the integer multiply function, the processor core can still be assigned tasks that only require instruction set A and may operate with no or with lesser reduction in performance.

Figure 2:
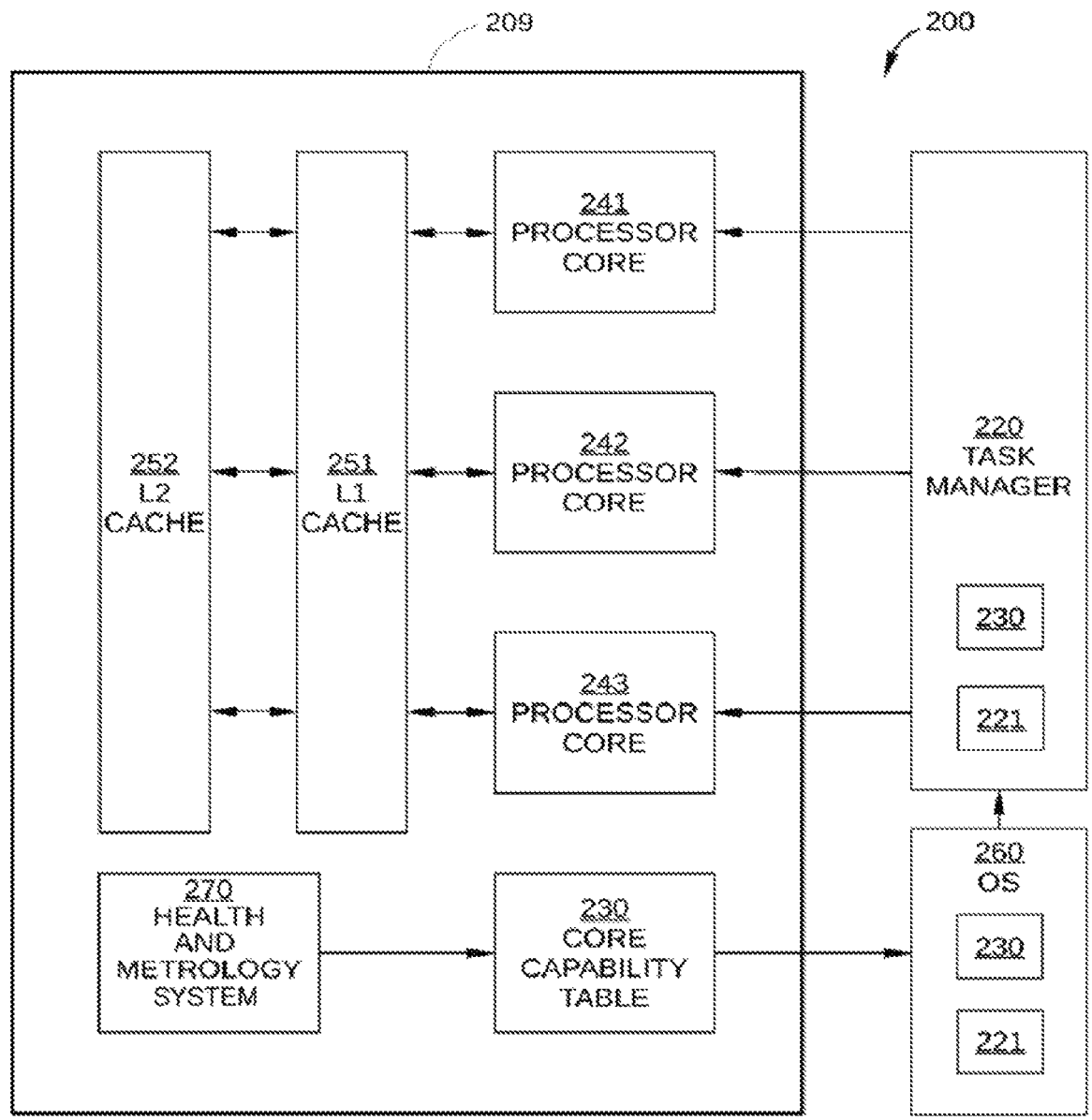
FIG. 2 shows a block diagram of an example embodiment of a chip multiprocessor.

FIG. 2 shows a block diagram of an example embodiment of a chip multiprocessor (CMP) 200, arranged in accordance with at least some embodiments of the present disclosure. CMP 200 may be a multi-core processor formed from a single integrated circuit die that can be configured to carry out parallel processing tasks (e.g., processing multiple threads) using multiple processor cores formed on the die. CMP 200 may include multiple processor cores 241-243, at least one L cache 251, at least one L2 cache 252, and a health and metrology system 270 formed on a single integrated circuit die 209, all of which may be operatively coupled to each other. For clarity and brevity, additional shared resources that may be present on integrated circuit die 209, such as I/O ports, bus interfaces, a power management unit, and the like, are omitted from FIG. 2. As shown, CMP 200 may be coupled to a task manager 220 and, in some embodiments, an operating system (OS) 260. A core capability table 230 associated with CMP 200 may be stored in a memory element disposed on integrated circuit die 209. Alternatively or additionally as shown in FIG. 2, core capability table 230 may be part of OS 260 or task manager 220.

Processor cores 241-243 may be processor cores with substantially identical or similar configurations or, in some embodiments, heterogeneous processor cores. As heterogeneous processor cores, each of processor cores 241-243 may be configured with a different instruction set for performing assigned tasks. For example, in one embodiment, processor core 241 may be configured with an instruction set analogous to instruction set A in FIG. 1, processor core 242 may be configured with an instruction set analogous to instruction set B in FIG. 1, and processor core 243 may be configured with an instruction set analogous to instruction set C in FIG. 1. Thus, when CMP 200 runs an application that uses instruction classes included in instruction set A, processor core 241 generally may be selected to perform tasks associated with the application. However, as described in greater detail below, the capability of processor core 241 to perform such tasks may deteriorate due to accumulated run-time or other faults. According to some embodiments, a different processor core of CMP 200 may be selected to perform tasks associated with the application that uses instruction classes included in instruction set A, if performance of CMP 200 can be improved relative to not performing the task(s) at all, relative to significantly delaying the performance of the task(s), etc. For example, processor core 243, which also includes instruction set A, may be used to perform such tasks. Alternatively or additionally, processor core 242 may be used to perform such tasks when the tasks can be performed by the portion of instruction set B that is shared with instruction set A.

In another example in which CMP 200 is configured with heterogeneous processor cores, processor core 241 may be configured with one instruction set, and processor core 242 may be configured with multiple, overlapping instruction sets. For instance, processor core 241 may be a Xeon E52665 CPU, which supports the instruction set extension Math Kernel Library (MKL), and processor core 242 may be a Xeon E53665 CPU, which supports the MKL instruction set and also includes the Advanced Vector Extensions (AVX) instruction set According to some embodiments, the capability of processor core 242 to perform tasks associated with the AVX instruction set and to perform tasks associated with the MKL instruction set are each updated as such capabilities change over the life of CMP 200. Thus, if the capability of processor core 242 to perform tasks associated with the AVX instruction set deteriorates due to accumulated run-time or other faults, processor core 242 can still be used to perform tasks associated with the MKL instruction set, and indicators for the capability of processor core 242 to use each such instruction set are updated accordingly. In some embodiments, these indicators may be stored in core capability table 230, which is described below. Alternatively or additionally, in embodiments in which processor core 242 can perform tasks associated with one instruction set, but can no longer perform tasks associated with a different instruction set, processor core 242 may be reported to OS 260 as a different processor core configuration. For instance, using the above example in which CMP 200 is configured with heterogeneous processor cores, when the capability of processor core 242 to perform tasks associated with the AVX instruction set deteriorates, processor core 242 may be reported to OS 260 as a Xeon E52665 CPU rather than as a Xeon E53665 CPU.

Task manager 220 may be a scheduler module that can be configured to repeatedly assign tasks to processor cores 241-243. In the embodiment illustrated in FIG. 2, task manager 220 is illustrated as a separate construct. In other embodiments, the functions of task manager 220 may be distributed between OS 260 and CMP 200. Furthermore, in some embodiments, such as depicted in FIG. 2, task manager 220 may include core capability table 230 and an instruction set capability updater module 221, each of which is described below.

Core capability table 230 may store the current capability of each of processor cores 241-243 in terms of different instruction sets and update the capability of each of processor cores 241-243 in terms of the different instruction sets during the life of CMP 200. For example, in some embodiments, core capability table 230 may comprise an array of per-core capability profiles, one capability profile for each of processor cores 241-243. Each entry in such a per-core profile may store a measured or otherwise quantified capability rating for the corresponding processor core for a specific instruction set. Capability ratings, for example, can be set to "0" to indicate that a specific processor core is incapable of performing tasks associated with an instruction set of interest. Each capability rating may include a quantitative value indicating the performance of the specific processor core with respect to the instruction set of interest. The different capability ratings for each of processor cores 241-243 and the updating of these capability ratings allows task manager 220 to select the optimal or otherwise appropriate processor core to perform a specific task, despite the changing capabilities over time of processor cores 241-243 due to accumulated non-failure faults, etc. In embodiments in which processor cores 241-243 may be initially homogeneous in configuration, the capability profile for each of processor cores 241-243 may be substantially identical at the beginning of the life of CMP 200, and each of the capability profiles may be modified as the performance of each of processor cores 241-243 is reduced via runtime faults and the like.

Capability ratings stored in core capability table 230 may be based on measured or otherwise determined/obtained quantities, such as function-level fault data collected by health and metrology system 270 during operation of CMP 200. In some embodiments, capability ratings stored in core capability table 230 may also be based on other performance metrics, such as the directly measured performance of each of processor cores 241-243 during normal operation. Instruction sets generally may be quite complex, and can include all instruction classes found in the architecture of a specific logical processor, such as the x86 or PowerPC architectures. For this reason, in some embodiments, capability ratings in core capability table 230 may be based on an amalgamated, or function-weighted value. For example, assuming that processor core 241 includes multiple duplicates of a particular computing submodule, such as a memory access operation, failure of one such computing submodule only may reduce the capability of processor core 241 incrementally when performing tasks associated with an instruction set that includes the memory access operation. In comparison, if processor core 241 only includes a single memory access operation and that submodule experiences a failure fault, processor core 241 may then be incapable of performing tasks that include the memory access operation, and this situation may be reflected as a 0 in core capability table 230.

As noted above, function-level fault data and other measurements collected by health and menology system 270 during operation of CMP 200 may be used to determine the capability ratings stored in core capability table 230. In some embodiments, capability updater module 221 may be configured to receive appropriate information from health and metrology system 270 over time, determine the updated capability rating for each of processor cores 241-243, and update core capability table 230. Capability updater module 221 may be disposed on integrated circuit die 209, or may be a function associated with task manager 220 and/or OS 260, and therefore may be implemented in hardware, firmware, and/or software associated with CMP 200 but not necessarily physically on-chip on integrated circuit die 209. For example, core capability table 230 may be implemented in a register, cache, or other circuitry that is either disposed on or off integrated circuit die 209.

Figure 3:
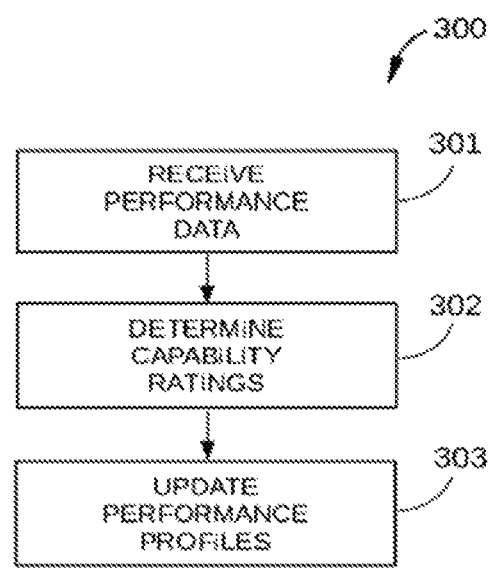
FIG. 3 sets forth a flowchart summarizing an example method for tracking performance capability of each of the processor cores in a chip multiprocessor.

FIG. 3 sets forth a flowchart summarizing an example method 300 for tracking performance capability of each of the processor cores in a chip multiprocessor, according to an embodiment of the disclosure. Method 300 may include one or more operations, functions or actions as illustrated by one or more of blocks 301, 302, and/or 303. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Additional blocks representing other operations, functions or actions may also be provided. Although method 300 is described in conjunction with CMP 200 of FIG. 2, any CMP suitably configured to perform method 300 is within the scope of this disclosure.

Method 300 may begin in block 301 "receive performance data." Block 301 may be followed by block 302 "determine capability ratings," and block 302 may be followed by block 303 "update performance profiles."

In block 301, capability updater module 221 receives performance data for one or more of processor cores 241-243 during operation of CMP 200. In some embodiments, the performance data received in block 301 may be received from health and metrology system 270 or OS 260 or from some other component(s) or combinations thereof. In some embodiments, the performance data received in block 301 are associated with the execution of a task or individual operation associated with a specific instruction set by one of processor cores 241-243. For example, the performance data received in block 301 may be based on an evaluation of the performance of processor core 241 when processing a task or operation using a specific instruction set, such as the x86 instruction set or the PowerPC instruction set.

In other embodiments, as described below in conjunction with FIG. 4, performance of processor cores 241-243 may be evaluated in terms of relatively less complex instruction sets. For example, each of processor cores 241-243 may each include a very limited number of instruction classes or even a single instruction class. In such embodiments, CMP 200 may include a much higher core count than the three shown in FIG. 2, and tasks assigned to processor cores may be generally organized in terms of such simplified instruction sets to better take advantage of the quantified capabilities of each of processor cores 241-243 with respect to each different instruction set.

In block 302, capability updater module 221 determines a capability rating for each of processor cores 241-243 for which performance data is received in block 301. In some embodiments, the capability rating determined in block 302 quantifies the ability of a processor core in CMP 200 to execute tasks or individual operations that are associated with a specific instruction set. Thus, as failure and non-failure faults are experienced during operation by one or more submodules in a specific processor core, the impaired ability of the processor core can be quantified and used in the assignment of tasks to the affected processor core.

In block 303, capability updater module 221 updates a performance profile associated with each of processor cores 241-243 for which a capability rating is determined in block 302. In some embodiments, the performance profiles updated in block 303 may be disposed in core capability table 230 of FIG. 2.

In some embodiments, particularly in high core-count CMPs, processor cores in a CMP may be configured for much less complex instruction sets than the x86, PowerPC, or System Z or other types of instruction sets. Specifically, each processor core (or a group of homogeneous processor cores) in a CMP may be configured with a small number of different computing submodules. The different instruction classes that can be executed by the computing submodules in this processor core can be defined as one instruction set. Similarly, other processor cores (or groups of homogeneous processor cores) in the same CMP may be each configured with a unique combination of a small number of computing submodules, and the instruction classes that can be executed by each of these combinations of computing submodules may be also defined as instruction sets. The different instruction sets so defined may overlap significantly, as illustrated by the largely nested instruction sets A-D in FIG. 1. Alternatively, the different instruction sets so defined may not overlap significantly, and therefore may have substantially orthogonal capabilities. Consequently, if one processor core in the CMP loses the capability to execute one instruction set, the capability of the CMP to execute orthogonal instruction sets is unaffected, since the orthogonal instruction sets may generally not be executed by the affected processor core anyway. Such diverse multiprocessor chips may be particularly advantageous when there is a relatively large population of processor cores and tasks, since this allows optimized matching between execution requirements and processor core capabilities. FIG. 4 illustrates a CMP configured in such a way. It is noted that the orthogonal instruction sets described above may also be subsets of more complex, but more commonly utilized instruction sets, such as the x86, PowerPC, or System Z instruction sets and/or other types of instruction sets.

Figure 4:
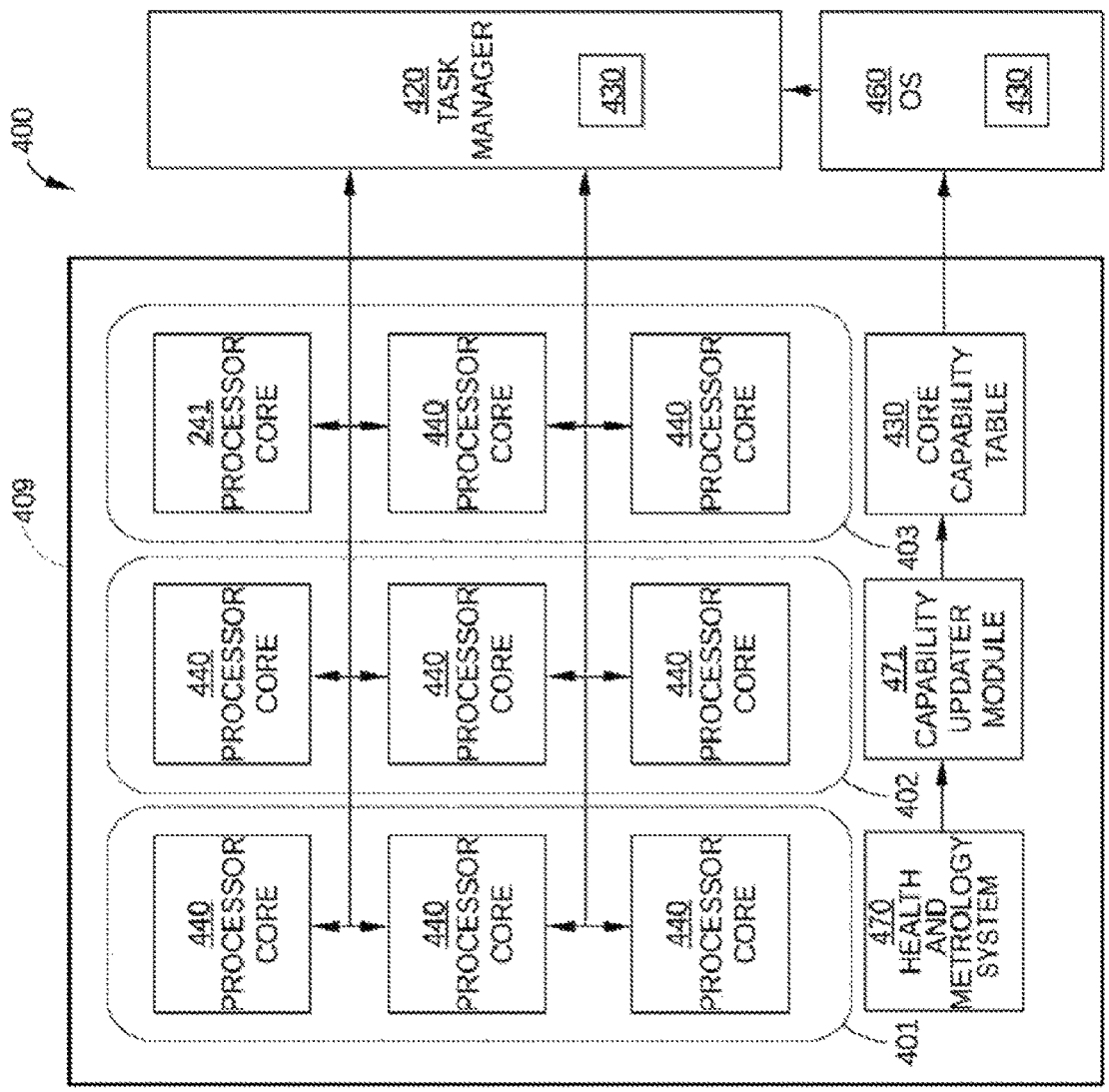
FIG. 4 shows a block diagram of an example embodiment of a high core-count chip multiprocessor.

FIG. 4 shows a block diagram of an example embodiment of a high core-count CMP 400, arranged in accordance with at least some embodiments of the present disclosure. CMP 400 may be a multi-core processor formed from a single integrated circuit die configured to carry out parallel processing tasks using multiple processor cores formed on the die. CMP 400 may include a plurality of processor cores 440 and a health and metrology system 470 on an integrated circuit die 409. For clarity and brevity, additional shared resources that may be present on integrated circuit die 409, such as L1 and L2 cache, I/O ports, bus interfaces, a power management unit, and the like, are omitted from FIG. 4. CMP 400 is depicted with 12 processor cores, but in some embodiments, CMP 400 may have hundreds or thousands of such processor cores.

As shown, processor cores 440 may be coupled to a task manager 420 and, in some embodiments, an operating system (OS) 460. A core capability table 430 associated with CMP 400 may be stored in a memory element disposed on integrated circuit die 409, or core capability table 430 may be part of OS 460 or task manager 420 as shown in FIG. 4, or may be stored elsewhere off-chip remotely from integrated circuit die 409. A capability updater module 471 may also be associated with CMP 400, and may be substantially similar to capability updater module 221 in FIG. 2. Capability updater module 471 may be configured to receive appropriate information from health and metrology system 470, determine the updated capability rating for each of processor cores 440, and update core capability table 430.

In some embodiments, each of processor cores 440 may be configured with a very limited number of instruction classes or even a single instruction class. Tasks assigned to processor cores 440 by task manager 420 can then be organized in terms of such simplified instruction sets to better take advantage of the quantified capabilities of each of processor cores 440 with respect to each different instruction set. In other words, a task may be assigned to a particular processor core 440 based on the capability of that particular processor core to execute the task of interest; because each processor core 440 is configured with a simplified instruction set and is therefore somewhat specialized, at least some processor cores 440 may have a high capability rating for any given task. The capability of each processor core 440 to execute tasks associated with a particular instruction set, or in some embodiments, a particular instruction class, may be stored in core capability table 430 and may be updated multiple times during operation of CMP 400.

Instruction sets included in core capability table 430 may comprise one or more instruction classes. As used herein, an instruction class may include a subset of an instruction set that makes use of shared physical circuit resources, such as a particular computing submodule. Thus, executable operations that make use of the same computing submodule, e.g., a floating point divide module, may be considered in the same instruction class. Consequently, if a computing submodule in a particular one of processor cores 440 fails, and there are no other instances of that submodule in the core, the processor core has no capability to support instruction sets that include the instruction class associated with the failed computing submodule. Examples of executable instructions that may be included in one or more instruction sets or instruction classes in core capability table 430 include a floating point divide operation, a floating point multiply operation, a floating point read only memory (ROM) operation, an integer divide operation, an integer multiply operation, an integer shuffle operation, a single instruction multiple data (SIMD) shift operation, an SIMD shuffle operation, a shift operation, a bus access operation, a memory access operation, a cache access operation, an on-chip network operation, an accelerator operation, a direct memory access (DMA) operation, a queue operation, a pipeline operation, and/or other operations.

In some embodiments, CMP 400 may include groups of homogeneous processor cores sharing the same or similar configuration. For example, in the embodiment illustrated in FIG. 4, CMP 400 may include a first group 401 of processor cores 440, a second group 402 of processor cores 440, and a third group 403 of processor cores 440. Each of the processor cores in first group 401 may have the same configuration, and therefore initially all may have the same capability rating. Over time, as runtime errors accumulate in each of the processor cores in first group 401, the capability rating of each processor core may be updated in core capability table 430 accordingly. Similarly, each of the processor cores in second group 402 may have the same configuration as each other, and each of the processor cores in third group 403 may have the same configuration as each other. Thus, if a processor core experiences a failure fault or has degraded performance with respect to a certain instruction set, another processor core in the same group can be used to execute tasks associated with that instruction set. Furthermore, while a processor core in CMP 400 may have a poor capability rating with respect to a specific instruction set or may even be incapable of executing the specific instruction set, the same processor core may simultaneously have a much higher capability with respect to other instruction sets. Therefore, the processor core can still be used as a computational resource for CMP 400, and may not be disabled. For example, a processor core 440 in processor group 402 may experience a fault that prevents that processor core from supporting instruction sets that other processor cores 440 in processor group 402 can support. According to some embodiments, the processor core that experienced such a fault may still be able to provide service equivalent to a processor core in processor group 401, and an indicator in core capability table 430 that is associated with the processor core in processor group 402 may be updated accordingly.

Figure 5:
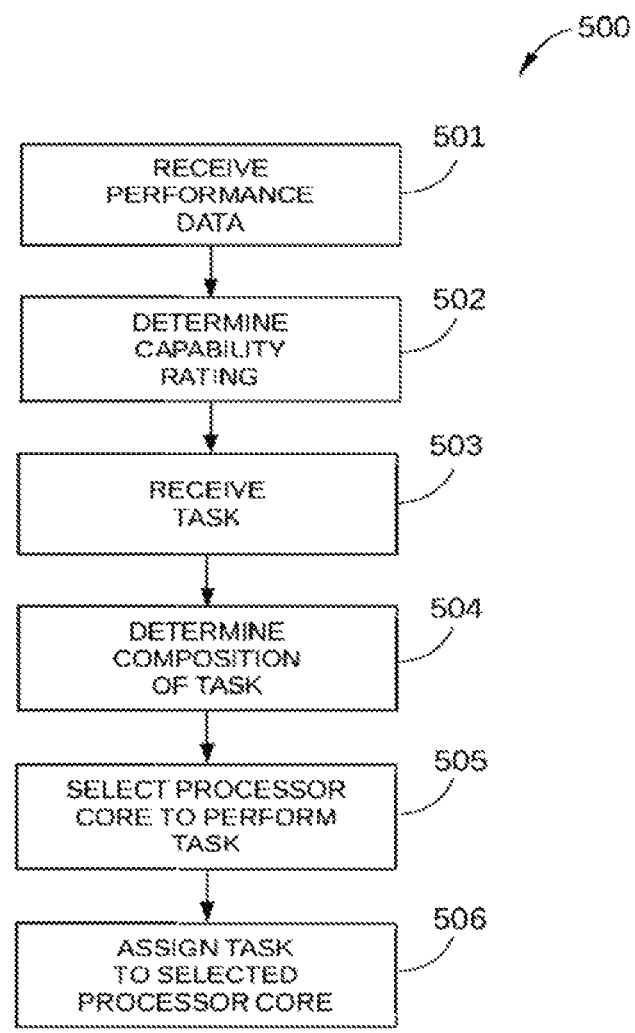
FIG. 5 sets forth a flowchart summarizing an example method of managing tasks performed by a chip multiprocessor having multiple processor cores.

FIG. 5 sets forth a flowchart summarizing an example method 500 of managing tasks performed by a chip multiprocessor having multiple processor cores, according to an embodiment of the disclosure. Method 500 may include one or more operations, functions or actions as illustrated by one or more of blocks 501, 502, 503, 504, 505, and/or 506. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Additional blocks representing other operations, functions or actions may also be provided. Although method 500 is described in conjunction with CMP 200 of FIG. 2, any CMP suitably configured to perform method 500 is within the scope of this disclosure.

Method 500 may begin in block 501 "receive performance data." Block 501 may be followed by block 502 "determine capability rating," block 502 may be followed by block 503 "receive task," block 503 may be followed by block 504 "determine composition of task," block 504 may be followed by block 505 "select processor core to perform task," and block 505 may be followed by block 506 "assign task to selected processor core."

In block 501, task manager 420 receives performance data for a processor core in CMP 200, the performance data being associated with the execution of an operation included in a first instruction class. The performance data may be received during operation of CMP 200 in response to a fault or error, as part of a periodic performance procedure, etc.

In block 502, task manager 420 determines a capability rating for the processor core to perform the operation included in the first instruction class.

In block 503, task manager 420 receives a task to be performed by CMP 200. In some embodiments, the task may be received from OS 460.

In block 504, task manager 420 determines a composition of the task received in block 503 with respect to various instruction set and/or instruction classes. In one embodiment, task manager 420 may determine what instruction set or sets the received task is associated with, such as instruction sets A-D in FIG. 1, or any other defined instruction set. In such an embodiment, task manager 420 may further analyze the task received in block 503 to determine what portion of said task can be performed using each of the different instruction sets. In another embodiment, task manager 420 may analyze the composition of the task received in block 503 with respect to individual instruction classes, that is, for example, quantifying how many floating point divide operations, integer multiply operations, etc. are included in the task.

In block 505, task manager 420 selects a processor core in CMP 200 for performing the task received in block 503. Selection of the processor core may be based on the composition of said task and on the capability rating of the processor core stored in core capability table 430. Because task manager 420 has quantified the composition of the task with respect to various instructions set and/or instruction classes, and because core capability table 430 provides updated measures of the ability of each processor core in CMP 200 to perform each of these various instruction sets or instruction classes, task manager 420 can select the most effective processor core for each task assigned to CMP 200. It is noted that processor cores with impaired performance, for example due to runtime faults or manufacturing defects, can still be selected for tasks that involve instruction sets or instruction classes that are unaffected or less affected by the impairment, rather than being disabled after detection of the fault or defect. It is further noted that the selection process in block 505 may be based on updated capability data from core capability table 430, and such capability data may reflect the current performance of processor cores in CMP 200. Consequently, selection of processor cores for executing assigned tasks may be improved despite changing conditions and capabilities of the processor cores in CMP 200.

In block 506, task manager 420 assigns the task to the processor core selected in block 504.

Figure 6:
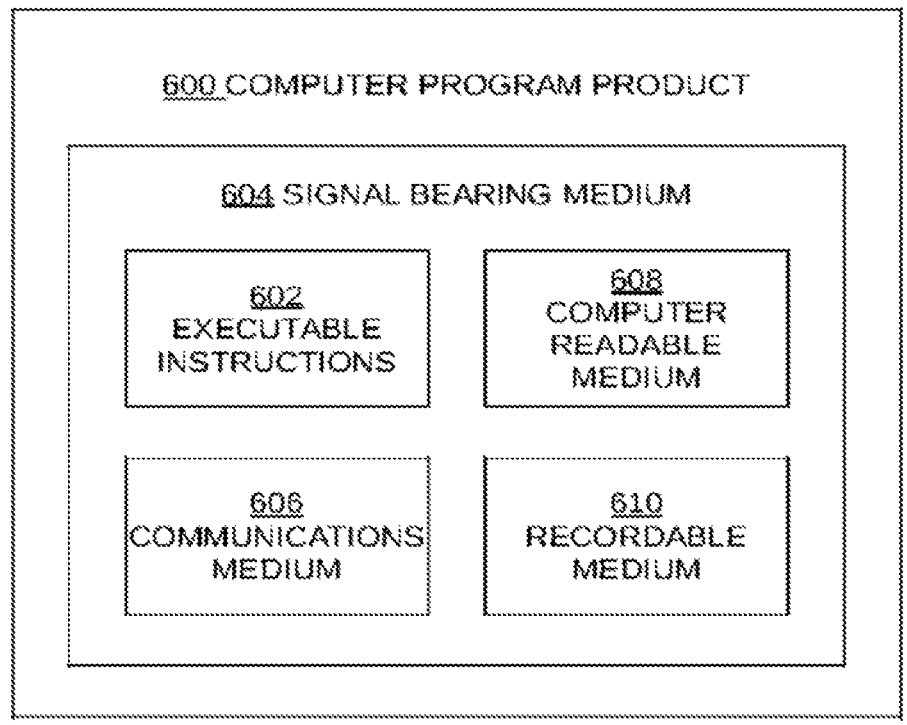
FIG. 6 is a block diagram of an illustrative embodiment of a computer program product to implement a method to manage tasks performed by a chip multiprocessor and/or a method to track performance capability of each of the processor cores in a chip multiprocessor.

FIG. 6 is a block diagram of an illustrative embodiment of a computer program product 600 to implement a method to manage tasks performed by a CMP and/or a method to update performance capability of each of the processor cores in a CMP. Computer program product 600 may include a signal bearing medium 604. Signal bearing medium 604 may include one or more sets of executable instructions 602 that, when executed by, for example, a processor of a computing device, may provide at least the functionality described above with respect to FIGS. 1-5.

In some implementations, signal bearing medium 604 may encompass a non-transitory computer readable medium 608, such as, but not limited to, a hard disk drive (HDD), a Compact Disc (CD), a Digital Video Disk (DVD), a digital tape, memory, etc. In some implementations, signal bearing medium 604 may encompass a recordable medium 610, such as, but not limited to, memory, read/write (R/W) CDs, R/W DVDs, etc. In some implementations, signal bearing medium 604 may encompass a communications medium 606, such as, but not limited to, a digital and/or an analog communication medium (e.g., a fiber optic cable, a waveguide, a wired communication link, a wireless communication link, etc.). Computer program product 600 may be recorded or otherwise stored on non-transitory computer readable medium 608 or another similar recordable medium 610.

Figure 7:
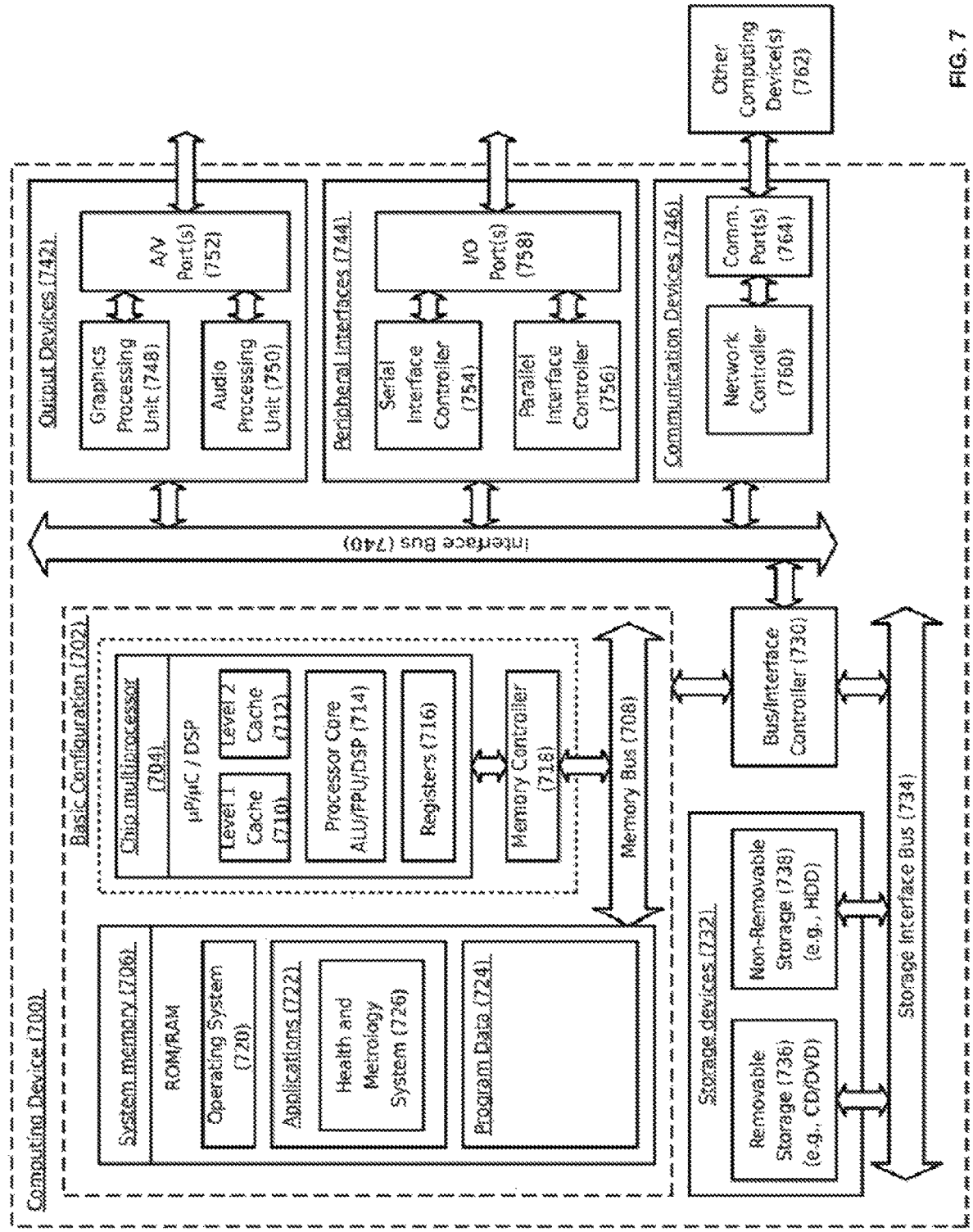
FIG. 7 is a block diagram illustrating an example computing device, all arranged in accordance with at least some embodiments of the present disclosure.

FIG. 7 is a block diagram illustrating an example computing device 700, according to at least some embodiments of the present disclosure. In a very basic configuration 702, computing device 700 typically includes one or more chip multiprocessors 704 and a system memory 706. A memory bus 708 may be used for communicating between processor 704 and system memory 706.

Chip multiprocessor 704 may be substantially similar in configuration and operation to CMP 200 in FIG. 2. Depending on the desired configuration, chip multiprocessor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a health and metrology system 726, similar to health and metrology system 270 of FIG. 2, arranged to perform at least the functions as those described with respect to method 300 of FIG. 3 and/or method 500 of FIG. 5. Program data 724 may be useful for operation with health and metrology system 726 as is described herein. In some embodiments, application 722 may be arranged to operate with program data 724 on operating system 720. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link, such as, without limitation, optical fiber, Long Term Evolution (LTE), 3G, WiMax, via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations or as a server device.

In sum, embodiments of the present disclosure provide systems and methods for managing tasks performed by a CMP or a method of tracking performance capability of each of the processor cores in a CMP by updating a performance profile associated with each processor core based on a determined capability. Embodiments of the present disclosure allow for the efficient and continued use of cores that are still capable of running some instruction sets despite faults. Embodiments also allow instruction-set specific recording and reporting of performance or disabling of each processor core in the CMP so that multicore work managers can still assign tasks to processor cores that fit within newly restricted capabilities after a fault.

There is little distinction left between hardware and software implementations of embodiments of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B. and C" would include but not be limited to systems that have A alone, B alone, C alone, A and B together, A and C together, B and C together, and/or A. B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system, comprising:
  a first processor core, of a chip multiprocessor, which performs an executable operation included in a first instruction class and performs an executable operation included in a second instruction class;
  a second processor core of the chip multiprocessor; and
  an operating system (OS) in communication with the first processor core and the second processor core,
  wherein in response to a detection of a fault in the first processor core in the performance of the executable operation included in the first instruction class, the OS is configured to update a performance profile of the chip multiprocessor to indicate a change in capability of the first processor core to perform the executable operation included in the first instruction class and to indicate that the first processor core remains enabled to perform the executable operation included in the second instruction class.

2. The system, of claim 1, wherein the first processor core and the second processor core are formed on a single die, and wherein the single die includes a storage unit to store the performance profile.

3. The system of claim 1, wherein the first processor core includes at least one duplicate of a particular computing submodule to perform the executable operation included in the first instruction class.

4. The system of claim 3, wherein in response to a detection of a failure of one of the particular computing submodules of the first processor core, the OS is configured to update the performance profile to indicate that the capability of the first processor core is incrementally reduced to perform the executable operation included in the first instruction class.

5. The system of claim 1, wherein the first processor core includes a single instance of a particular computing submodule to perform the executable operation included in the first instruction class.

6. The system of claim 5, wherein in response to a detection of a failure of the particular computing submodule of the first processor core, the OS is configured to update the performance profile to indicate that the first processor core is incapable to perform the executable operation included in the first instruction class.

7. The system of claim 1, wherein the executable operation included in the first instruction class is performable by a first processing element of the first processor core and is incapable of being performed by a second processing element of the first processor core, and wherein the executable operation included in the second instruction class is performable by the second processing element and incapable of being performed by the first processing element.

8. A system, comprising:
a chip multiprocessor core which includes multiple processor cores; and
a task manager coupled to the chip multiprocessor core, wherein the task manager is configured to:
receive a task to be performed by the chip multiprocessor core;
select a first processor core of the multiple processor cores based on a first capability rating of the first processor core, wherein the first capability rating comprises a stored value that quantifies an ability of the first processor core to perform an operation included in an instruction class;
assign the task to the selected first processor core;
detect a fault in the selected first processor core in performance of the assigned task; and
in response to the detection of the fault:
assign at least some operations associated with the assigned task to a second processor core of the multiple processor cores based on a second capability rating of the second processor core; and
update the first capability rating of the first processor core.

9. The system of claim 8, wherein the task manager is further configured to:
receive performance data for the selected first processor core after the assignment of the task to the selected first processor core, wherein the performance data is associated with execution of the operation included in the instruction class; and
modify the first capability rating of the selected first processor core based on the received performance data.

10. The system of claim 8, wherein the task manager is configured to receive the task from an operating system (OS).

11. The system of claim 8, wherein the task manager comprises a core capability table, and wherein the core capability table comprises an array of capability profiles for each processor core of the multiple processor cores.

12. The system of claim 11, wherein the task manager is configured to select the first processor core based on a composition of the received task and based on the first capability rating, of the first processor core, stored in the core capability table.

13. The system of claim 12, wherein the stored first capability rating is collected based on obtained function-level fault data.

14. The system of claim 12, wherein the stored first capability rating is directly measured based on performance of the first processor core.

15. The system of claim 11, wherein the core capability table is implemented in one of a register and a cache, and wherein each of the core capability table and the chip multiprocessor core is disposed on an integrated circuit die.

16. A method to manage tasks performed by a chip multiprocessor core, the method comprising:
receiving a task to be performed by the chip multiprocessor core;
selecting a first processor core of the chip multiprocessor core based on a capability rating of the first processor core, wherein the capability rating comprises a stored value that quantifies an ability of the first processor core to perform an operation included in an instruction class;
assigning the task to the selected first processor core;
detecting a fault in the selected first processor core in performance of the assigned task; and
in response to the detection of the fault, updating a performance profile of the chip multiprocessor core to indicate a change in capability of the first processor core to perform the operation included in the instruction class.

17. The method of claim 16, further comprising determining a composition of the received task with respect to operations associated to each of a first instruction class and a second instruction class.

18. The method of claim 17, wherein detecting the fault comprises detecting a fault in the selected first processor core in performance of the operation associated with the first instruction class.

19. The method of claim 18, further comprising in response to the detection of the fault, continuing to use the first processor core to perform the operation associated with the second instruction class.

20. The method of claim 16, further comprising:
receiving performance data for the selected first processor core after assigning the task to the selected first processor core, wherein the performance data is associated with execution of the operation included in the instruction class; and
modifying the capability rating of the selected first processor core based on the received performance data.

* * * * *